Aug. 7, 1928.
A. RUDY
1,680,175
SOARING HELICOPTER
Filed May 14, 1927 2 Sheets-Sheet 1
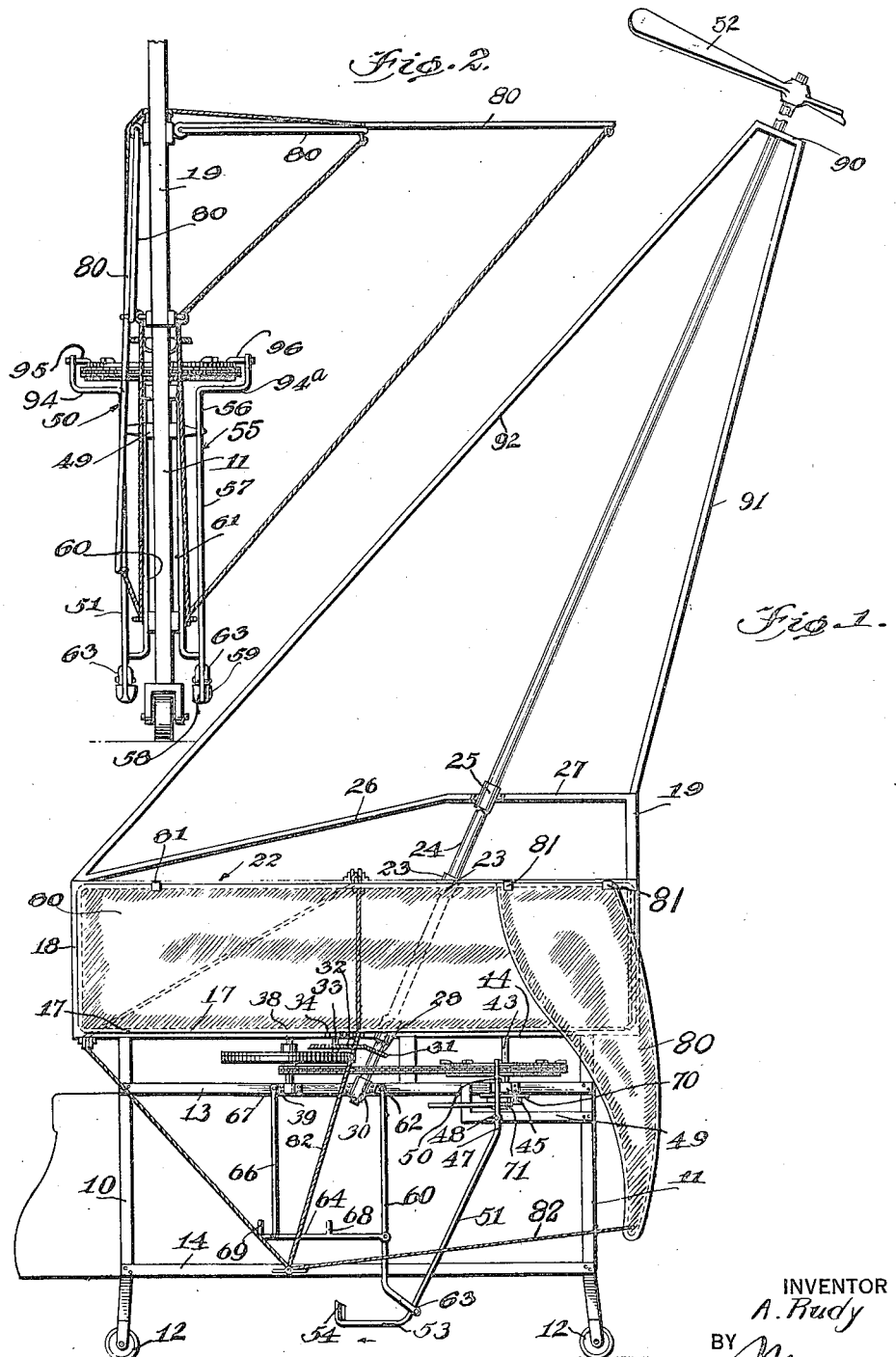
INVENTOR
A. Rudy
BY
ATTORNEY

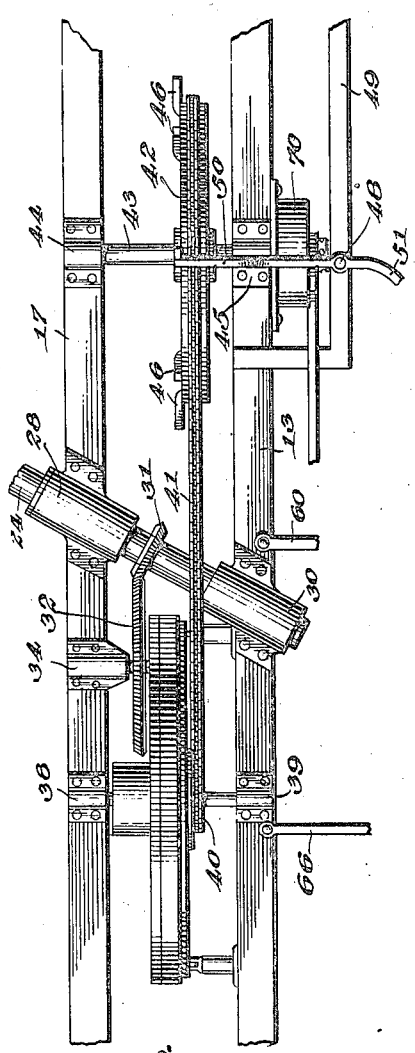

Patented Aug. 7, 1928.

1,680,175

UNITED STATES PATENT OFFICE.

ABRAHAM RUDY, OF WASHINGTON, DISTRICT OF COLUMBIA.

SOARING HELICOPTER.

Application filed May 14, 1927. Serial No. 191,361.

This invention relates to a soaring helicopter.

An object of the invention is the provision of a helicopter, which is of such construction that the same may be propelled manually, and which is provided with a propeller of particular construction, whereby the helicopter may be elevated vertically, and in which wings are provided foldable through the frame and being extensible for soaring purposes.

Another object of the invention is the provision of a helicopter having a body in the form of a frame, which is of such rectangular shape that spinning will be prevented, and whereby only one propeller is required for lifting purposes.

A further object of the invention is the provision of a helicopter in which man power may be employed for causing rotation of the shaft with a minimum amount of effort, the spring motor, or other mechanical means, being initially brought into action for causing rotation of the shaft and propeller in advance of the application of the man power.

A further object of the invention is the provision of a helicopter in which a wheel is adapted to be revolved through man power and geared to the propeller shaft, said wheel being provided with a plurality of radial projections adapted to be engaged by impacts from the short end of the lever, the longer arm of the lever having a treadle adapted to be actuated by the feet of the operator in a substantially horizontal manner.

Another object of the invention is the provision of a helicopter in which a mechanism is employed for causing rotation of a propeller shaft, and which is adapted to be actuated by sudden impacts, and in which the power of the impact is multiplied through a system of levers and gearing, whereby the levers are operated by the feet, hands and arms of the aviator.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view in elevation of a helicopter constructed according to the principles of my invention.

Figure 2 is an end view of the helicopter,

Figure 3 is a fragmentary side view,

Figure 4 is a plan view,

Figure 5 is a fragmentary vertical section of the starting motor,

Figure 6 is a plan view of the starting motor.

Referring more particularly to the drawings, 10 and 11 designate respectively the legs at the opposite ends of the frame, and which are adapted to be supported on the ground by wheels 12, which may, in effect, simulate the running gear of the helicopter. The legs are braced by means of spaced longitudinal bars 13 and 14.

Secured in any approved manner to the upper ends of the legs is a longitudinal bar 17 from which rise struts 18 and 19. A longitudinal bar 22 is connected at its opposite ends to the struts 18 and 19, and is provided with a bearing 23 inclined at an angle to receive the propeller shaft 24, which is likewise inclined at an angle to the vertical. A second bearing 25 is carried by a pair of bars 26 and 27 connected to the upper ends of the struts 18 and 19. A third bearing 28 is carried by a longitudinal bar 17, and is also inclined at the same angle to the vertical as the bearing 23. A bearing 30 is supported by a transverse bar 13, and is in alinement with the bearings 23, 25 and 28. The framework just described is formed of balsa wood, and is reinforced in any approved manner, so that it will be capable of supporting the driving mechanism of the propeller shaft, and also for supporting the weight of the driving shaft, the propeller and the operator of the helicopter.

The propeller shaft is driven through a beveled gear 31, meshing with a gear 32 mounted on a shaft 33, which is supported in bearings 34 carried by the longitudinal bar 17. A spur gear 35, secured to shaft 33, meshes with a ring gear 36, which is secured to a shaft 37. This shaft is mounted in bearings 38 carried by the bar 17, and in bearings 39 carried by the bar 13. A small sprocket 40 is secured to shaft 37, and is driven through a chain 41 trained on a sprocket 42.

The sprocket 42 is secured to the shaft 43, which has one end mounted in bearings 44 carried by the bar 17. The other end of the shaft is mounted in a bearing 45 carried by the bar 13. Thrust bearings are provided at the lower ends of the shafts 37 and 43. The sprocket 42 has lugs 46 secured to its upper face, said lugs being radially disposed and projecting beyond the periphery of the sprocket for a purpose which will be presently explained.

A lever 47 is pivoted at 48 on a bracket 49 carried between the leg 11 and the bar 13. The short end 50 of the lever has a horizontal arm 94 extending laterally from the frame, and is provided with a lug 95 adapted to engage the lugs 46 with a sudden impact when the long arm 51 of the lever 47 is actuated, causing the rotation of the sprocket, and simultaneously the rotation of the propeller shaft 24 and the propeller 52. The lower end of the long arm 51 of the lever, which is located at one side of the frame, is provided with a horizontal portion 53, having a treadle or foot piece 54 adapted to be engaged by the heel of the right foot of the operator of the machine for forcing the horizontal portion rearwardly in the direction indicated by the arrow in Figure 1, and for moving the small arm 50 in the opposite direction for engaging a lug 46 of the sprocket 42.

A second lever 55 is pivoted on the same shaft 48 as the lever 47 and has a short arm 56 provided with a lateral extension 94ᵃ carrying a lug 96 adapted to engage the lugs 46 in the opposite direction from that engaged by the lugs 95 of the lever 47. The long arms 57 of the lever 55 extends downwardly and in alinement with the long arm 51 of the other lever, and is provided with a horizontal portion 58 and a treadle 59 adapted to be engaged by the toe of the left foot of the operator for moving the lever forwardly in opposition to the movement of the lever 57.

A pair of links 60 and 61 are pivoted at 62 on the opposite sides of the longitudinal bar 13, and extend downwardly, and are provided with an inturned portion or fork 63 embracing the lever 47, or the lever 55, as the case may be, and are adapted, when actuated, to aid in actuating the levers 47 or 55.

A horizontal arm 64 is secured to the lever 60, while a horizontal arm 65 is pivotally connected to the lever 61. A pair of links 66, pivotally mounted at 67 on opposite sides of the bar 13, extend downwardly in spaced relation with the links 60 and 61, and each link is connected to the bars 64 or 65, which is on the same side of the frame as a link 60 or 61. Each bar 64 or 65 is provided with a hand grip 68, and a seat 69 adapted to receive the elbow of the operator as will be presently explained.

In order to initially start the mechanism for rotating the shaft 24 in advance of the application of man power to the levers 47 and 55, I have provided a spring motor 70, which contains a spring of sufficient length and width to cause the shaft 43, and likewise the sprocket 42 and the associated gearing, to be revolved, causing a rapid and sudden rotation of the shaft 24, said spring motor being adapted to be automatically released in the usual manner when the man power is applied to the levers 47 and 55.

In order to wind the spring and place the motor in an operative starting position, I have provided a barrel 71 connected to the motor, and provided with a plurality of radially disposed passages 72 in which a rod is inserted, so that the motor may be wound and the spring placed under sufficient tension for causing initial rotation of the shaft 24. A pawl 73, pivoted at 74, is adapted to engage the teeth 75 connected with the drive shaft of the spring motor for preventing rotation of the motor when the spring is being wound. An operating rod 76 is connected with the pawl 73, and adapted to rock said pawl and release it from the teeth 75 for placing the motor in operative relation with the shaft 43.

Wings 80 are hinged at 81 on the bar 22, and are normally maintained in a vertical position adjacent the upper portion of the frame until they are needed for soaring purposes when they are released and permitted to be elevated by wind pressure to a substantially horizontal position, or at a slight angle to the horizontal as may be necessary for the proper sliding of the helicopter. These wings are controlled by cables 82, which are within reach of the operator of the helicopter. A seat 93 is secured to the bar 14.

The outer end of the propeller shaft 24 is mounted in a bearing 90, which is braced by struts 91 and 92 secured in any approved manner to the upper ends of the struts 18 and 19, and braced in any suitable manner for maintaining the struts 91 and 92 and the shaft 24 in position.

Wings 80 are hinged at 81 to the bar 22 with a wing being located upon an opposite side of the frame. Cables 82 connected to the ends of the wings control the position of said wings. When the wings 80 are elevated the wings are raised.

Having thus fully described the invention what is claimed is:

1. A soaring helicopter comprising a frame arranged in a vertical plane, a propeller shaft rotatably mounted on the frame, a sprocket mounted for rotation on the frame and provided with radially projecting lugs, a pair of levers pivotally mounted on said frame and having a short arm adapted to impactly coact with the lugs for causing rotation of the sprocket, the long arms of the levers having foot engaging means and adapted to be rocked by the feet of the operator of the helicopter, and means operatively connecting the sprocket and shaft for causing rotation of the shaft.

2. A soaring helicopter comprising a frame arranged in a vertical plane, a propeller shaft rotatably mounted on the frame, a sprocket mounted for rotation on the frame and provided with radially projecting lugs, a pair of levers pivotally mounted on said frame and having a shaft arm adapted to impactly coact with the lugs for causing rotation of the sprocket, the long arms of the levers having foot engaging means and adapted to be rocked by the feet of the operator of the helicopter, and means operatively connecting the sprocket and shaft for causing rotation of the shaft, a motor operatively connected with the sprocket for causing an initial rotation of the sprocket in advance of the rotation of the sprocket by the levers.

3. A soaring helicopter comprising a frame arranged in a vertical plane, a propeller shaft rotatably mounted on the frame, a sprocket mounted for rotation on the frame and provided with radially projecting lugs, a pair of levers pivotally mounted on said frame and having a short arm adapted to impactly coact with the lugs for causing rotation of the sprocket, the long arms of the levers having foot engaging means and adapted to be rocked by the feet of the operator of the helicopter, and means operatively connecting the sprocket and shaft for causing rotation of the shaft, said levers being movable in opposite directions.

4. A soaring helicopter comprising a frame, a propeller shaft rotatably mounted on the frame, a sprocket mounted for rotation on the frame and provided with radially projecting lugs, a pair of levers pivotally mounted intermediate their ends on said frame and including a short arm and a long arm, the short arms having lateral projections extending radially of the sprocket and having upstanding lugs adapted to impactly coact with the lugs on the sprocket for causing rotation of the sprocket, the long arms of the levers having foot engaging means and adapted to be rocked by the feet of the operator, and means operatively connecting the sprocket and the shaft, whereby rotation of the sprocket will cause rotation of the shaft.

5. A soaring helicopter comprising a frame, a propeller shaft rotatably mounted on the frame, a sprocket mounted for rotation on said frame and provided with radially projecting lugs, a pair of pivotally mounted levers provided with engaging lugs to impactly coact with the lugs on sprocket to cause the rotation of said sprocket, a ring gear rotatably mounted on the frame, means operatively connecting the ring gear with the sprocket, whereby rotation of the sprocket will cause rotation of the ring gear, a spur gear meshing with the ring gear, a bevel gear driven by the spur gear, and a bevel gear rigid with the propeller shaft and meshing with the first-mentioned bevel gear.

6. A soaring helicopter comprising a frame, a propeller shaft rotatably mounted on the frame, a sprocket mounted for rotation on the frame and provided with radially projecting lugs, a pair of levers pivotally mounted intermediate their ends on said frame and including a short arm and a long arm, the short arms having lateral projections extending radially of the sprocket and having upstanding lugs adapted to impactly coact with the lugs on the sprocket for causing rotation of the sprocket, the long arms of the levers having foot engaging means and adapted to be rocked by the feet of the operator, and means operatively connecting the sprocket and the shaft, whereby rotation of the sprocket will cause rotation of the shaft, the arms being movable in the opposite direction, the lug on one arm coacting with one face of the lugs on the sprocket, the lug on the other arm of the other lever coacting with the similar face on the other lug at diametrically opposite points.

7. A soaring helicopter comprising a frame, a propeller shaft rotatably mounted on said frame, a sprocket having an operative connection with a propeller shaft and causing rotation of said shaft, said sprocket being provided with radially projecting lugs, levers pivotally mounted intermediate their ends at opposite sides of the frame and having short arms adapted to coact impactly with the lugs for causing rotation of the sprocket, the long arms of the levers having foot engaging means causing rocking of the levers in opposite directions, links pivotally mounted on opposite sides of the frame, each pair of links having a sliding connection with the lever and adapted to be manually rocked for aiding in rocking the levers.

8. A soaring helicopter comprising a frame, a propeller shaft rotatably mounted on said frame, a sprocket having an operative connection with a propeller shaft and causing rotation of said shaft, said sprocket being provided with radially projecting lugs, levers pivotally mounted intermediate their ends at opposite sides of the frame and having short arms adapted to coact impactly with the lugs for causing rotation of the sprocket, the long arms of the levers having foot engaging means causing rocking of the levers in opposite directions, a pair of links pivotally mounted on each side of the frame, one of the links having a sliding connection with a lever, and a manually operated arm on each side of the frame and having rigid connections with a pair of links on each side.

ABRAHAM RUDY.